United States Patent [19]

Lance

[11] Patent Number: 4,517,259

[45] Date of Patent: May 14, 1985

[54] AIR MOTOR DRIVE FOR FUEL CELL POWER PLANT AIR CIRCULATOR

[75] Inventor: Joseph R. Lance, North Huntingdon Township, West Moreland County, Pa.

[73] Assignee: Westinghouse Electric Corp., Pittsburgh, Pa.

[21] Appl. No.: 592,982

[22] Filed: Mar. 23, 1984

[51] Int. Cl.³ .............................................. H01M 8/04
[52] U.S. Cl. ........................................ 429/26; 429/34
[58] Field of Search ............... 429/17, 34, 38, 39, 429/26, 12, 22

[56] References Cited

U.S. PATENT DOCUMENTS 3,473,963  10/1969  Sanderson ........................... 136/86
3,576,677  4/1971  Keating et al. ...................... 136/86
4,362,789  12/1982  Dighe ................................. 429/17

Primary Examiner—Donald L. Walton
Attorney, Agent, or Firm—Joel R. Petrow

[57] ABSTRACT

Disclosed is an air motor/fan circulator system for circulating air around a fuel cell power plant circuit. The system requires no steam, gas, or electrical penetrations into the fuel cell power plant circuit and further meets the requirements of being able to circulate in excess of one million pounds-mass per hour around the circuit through a pressure difference of about one pound per square inch. The system is suitable for use under fuel cell power plant conditions: a system pressure of several atmospheres and a system temperature of several hundred degrees.

6 Claims, 3 Drawing Figures

AIR MOTOR DRIVE FOR FUEL CELL POWER PLANT AIR CIRCULATOR

BACKGROUND OF THE INVENTION

Fuel cell power plants require a gas flow circuit to provide oxygen bearing gas (usually air) for process feed to the cathode side of the fuel cell where a portion of the oxygen is consumed and to provide cooling of the fuel cell.

The pressure in this flow circuit is maintained by a compressor that draws air from the ambient atmosphere and compresses it to that of the flow circuit which is typically several atmospheres. Under steady state operating conditions oxygen depleted air is exhausted from the circuit subsequent the fuel cell at the compressor charging rate.

Although the circuit pressure is several atmospheres and the pressure drop around the circuit is only about one atmosphere the mass flow rate around the circuit is usually more than an order of magnitude greater than the mass flow rate of the compressor charging the circuit. The circuit temperature meanwhile is on the order of several hundred degrees Fahrenheit.

While fans for circulating air across a pressure differential of one psi with a flow rate in excess of one million pounds (mass) per hour are readily and commercially available for use at atmospheric pressures, fans with these performance characteristics that operate in a high pressure, high temperature environment of several atmospheres and several hundred degrees Fahrenheit and operated by an electric motor or steam turbine require a special housing or casing, are complex, and difficult to design. A high pressure housing or casing for the fan is necessary along with either an external steam or electric motor operating through a sealed rotating shaft or an internal electric motor that is specially cooled. Gas or liquid and electrical penetrations into the operating system would prove complex and expensive as well as providing potential failure modes.

The flow circuit for a gas cooled phosphoric acid fuel cell (PAFC) power plant consists of circulating air for both cooling and process feed to the cathode side of the fuel cell where a portion of the air is consumed. Make up air is supplied to this circuit by a compressor which compresses ambient air from 14.6 psia to 50 psia at a flow rate of 64,320 pounds mass per hour. The air flow rate within the circulating loop is much higher at 1,039,000 pounds mass per hour. A fan or circulator must drive this circulating air across a pressure differential of approximately 1.0 psia. This 1.0 psia pressure differential is due to the fuel cells and the heat exchanger where thermal energy is removed from the circulating air, and the associated air piping and fittings.

The mean pressure and temperature within the air circuit is 50 psia and 271° F. These are nominal values which may vary slightly with actual power plant designs. Fans for circulating air across a pressure differential of 1.0 psia with a flow rate of 1,039,000 pounds mass per hour are not unusual when only a low pressure housing or casing is required for the fan. However the PAFC circulating fan requires a housing or casing suitable for an internal operating pressure of 50 psia which is unusual given present design and construction practices for commercially available fans and blowers. The PAFC power plant, therefore, will require a fan in a configuration that is not available commercially at present.

If a special high pressure casing for the fan is used and it is driven from an electric motor or steam turbine through a sealed rotating shaft, the shaft seal and bearings constitute potential sources of failure in the operating PAFC power plant. The shaft bearings and seal could be eliminated by constructing the fan and an electric motor entirely within the circulating air duct, but a special electric motor would be required to operate in an ambient air condition of 271° F. and either liquid or gas cooling may be required for the motor. Electric wiring leads for the motor will also add complexity, cost, and present potential failure modes. In addition a special enclosed motor designed for high temperature operation possibly with its own cooling system would be expensive.

U.S. Pat. No. 3,473,963 discloses a fuel cell that circulates oxygen bearing process gas by means of a constant volume air pump driven by an electric motor external to the flow system.

U.S. Pat. No. 3,576,677 discloses a fuel cell that circulates oxygen bearing process gas by means of a fan driven by an electric motor. The entire motor-fan system is inside the flow circuit requiring a casing to withstand the circuit pressure and the motor must be capable of operating at system temperature.

SUMMARY OF THE INVENTION

An apparatus is provided for circulating oxygen bearing gas to the cathode side of the fuel cell and around the fuel cell circuit. The apparatus requires no electric or steam driving means, but rather uses pressure differences either within the system or between the system and the atmosphere to drive a turbine which, in turn, powers the circulating fan. The entire drive system is internally located and it requires no separate penetrations or cooling. A portion of the circulating air is bled off through the air motor to drive the fan. The air motor is controlled by a valve which adjusts the bleed air which can then be used for other purposes in the plant if desired. The air flow can be returned to the compressor inlet, used in some other portion of the fuel cell power plant, or vented to the atmosphere through the plant cooling tower air side. With the air motor located within the fuel cell circulating air duct, it is feasible to use a simple propeller type fan in the round duct to provide the 1.0 psia pressure differential and greater than one million pound mass per hour flow rate resulting in mechanical and geometrically simple fan, housing, and impeller designs.

DESCRIPTION OF THE PREFERRED EMBODIMENT

Figure 1:
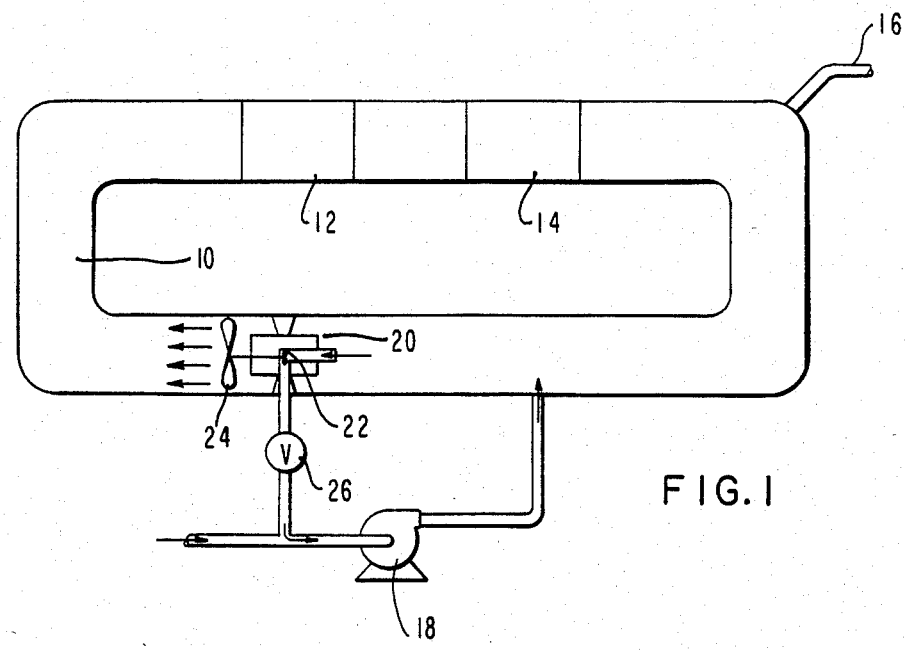
FIG. 1 is a schematic illustration of a portion of a fuel cell power plant showing the flow circuit incorporating the present invention.

Referring to FIG. 1 there is shown a phosphoric acid fuel cell system with the generation of dc electricity directly from the fuel cell as well as for the production of steam from the hot exhaust gases generated. This system incorporates the present invention.

An oxygen bearing gas such as air flows through the circulation duct 10 to the phosphoric acid fuel cell stack 12 where the oxygen reacts in the fuel cell with hydrogen fuel in the presence of a catalyst (not shown) to produce direct electric current and hot exhaust gases such as $CO_2$ and $H_2O$. These gases flow along the circulation duct 10 to the steam drum 14 where heat is removed from the exhaust gases and steam is generated from water (not shown).

A portion of the cooled exhaust gas is then released from the system through exhaust port 16 the remaining gas continues along the circulation duct 10 and is mixed with fresh incoming air from the output of compressor 18. A portion of the combined exhaust gas/air mixture exits the circulation duct through the air motor 20 to the compressor 18 inlet by passing through the air motor from a pressure of several atmospheres to a subatmospheric pressure as a result energy is imparted to the turbine 22 of the air motor which in turn drives the fan 24. The fan provides the means by which the gases within the duct 10 are circulated. Valve 26 is used to control the amount of gas passing through the air motor 20 thus controlling a flow rate around the circulation duct.

Figure 2:
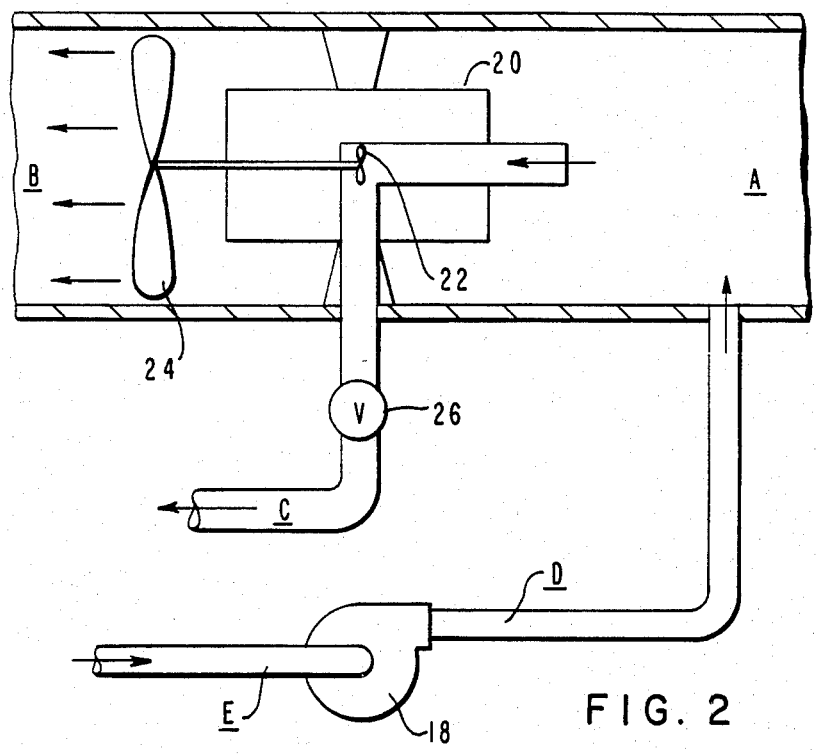
FIG. 2 is an illustration of an alternative embodiment of the present invention.

In an alternative embodiment shown in FIG. 2 the gas passing through the air motor 20 driving the turbine 22 and regulated by valve 26 is exhausted to the atmosphere. This arrangement eliminates the need for exhaust port 16 and utilizes the pressure difference between the system pressure of several atmospheres and normal atmospheric pressure.

Figure 3:
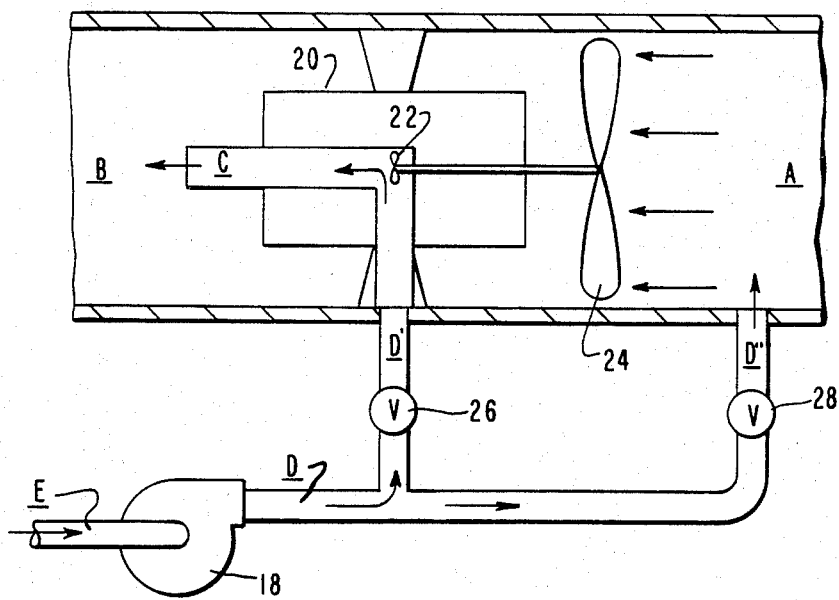
FIG. 3 is an illustration of another embodiment of the present invention.

Another embodiment is shown in FIG. 3 wherein the output air of compressor 18 partially flows through valve 26 into the air motor 20 and into the system mixing with the system gases. The pressure difference between the output head created by the compressor 18 and the system pressure is utilized to turn turbine 22 thus rotating fan 24 that circulates the system gas. The remaining portion of the compressor output air is pumped into the system gases through a second valve 28. A separate exhaust port 16 is again required for this system.

The compressor is a standard component of a phosphoric acid fuel cell power plant. When the air motor drive is added to the system, however, the size and capacity of the compressor must be increased slightly to make up for the air motor bleed flow. Thermodynamic state point data for the relevant portion of the phosphoric acid fuel cell power plant and rotating group shaft horse powers with and without the air motor given in the tables for two of the embodiments described above. The air motor efficiency was assumed to be 70% for the comparison.

The horsepower data without the air motor demonstrates the expander and steam turbine can produce more power than the compressor, circulator and combustion air fans consumed. The expander, steam turbine and compressor are incorporated in the rotating group (not shown) of the fuel cell power plant. At rated plant conditions therefore 6% of the steam is bypassed around the steam turbine.

Thermodynamic state points and shaft horsepower for the embodiment shown in FIG. 2 is given in table 1. In this particular air motor embodiment the air bleed flow rate through the air motor and pressure differential have been adjusted so that the horsepower consumed by the compressor is equal to that produced by the expander and steam turbine. When the air motor is used in this embodiment no steam is bypassed around the steam turbine at rated plant output.

The embodiment shown in FIG. 3 has a portion or all of the compressor air flow going through the air motor which exhausts internally into the circulating air duct. While the embodiment shown in FIG. 2 requires a higher flow rate compressor than would be required for a system not utilizing the invention, the embodiment of FIG. 3 requires the same flow rate from the compressor but at a higher pressure. There are two modes of operating the FIG. 3 embodiment. These are with partial compressor output through the air motor or with full compressor output through the air motor. With partial air motor flow, valve 26 open and valve 28 partially closed, a compressor output pressure of 92 psia is required and there is no excess shaft horsepower available for accelerating the rotating group. With full air motor flow, valve 28 closed, all of the compressor output is piped through the air motor. In this operating mode a compressor output pressure is reduced to 72 psia, the compressor input power requirement is reduced, and there is considerable excess shaft horsepower available for rotating group acceleration. The state points and shaft horsepowers for the FIG. 3 embodiment are given in table 2.

Variations in all three embodiments of air motor configurations with respect to particular flow paths, operating modes, the compressor sizes and output conditions can be used to satisfy plant operating requirements at fuel cell module beginning of life and end of use conditions.

The bleed air which is exhausted externally from the air motor can be used to supply combustion air to the plant fuel processor (not shown), exhausting the air through the air side of the plant cooling tower (not shown), or feeding the exhaust back into the compressor inlet.

The bleed air flow rate through the air motor can also be adjusted to provide different exhaust pressures in order to improve controllability, to balance compressor power requirements against steam turbine bypass flow, or to provide a source of air for other plant uses such as valve operators.

TABLE 1

Statepoints And Shaft Horsepower Comparison With Air Motor External Exhaust Configuration

| State Point | Without Air Motor | | | With Air Motor | | |
|---|---|---|---|---|---|---|
| | m | T | P | m | T | P |
| (A) | 16,245 | 269 | 49 | 16,245 | 269 | 49 |
| (B) | 17,317 | 273 | 50 | 17,746 | 273 | 50 |
| (C) | Not Applicable | | | 429 | −33 | 14.9 |
| (D) | 1,072 | 348 | 50 | 1,501 | 348 | 50 |
| (E) | 1,072 | 80 | 14.6 | 1,501 | 80 | 14.6 |

| | HP | HP |
|---|---|---|
| Compressor | −1618 | −2265.5 |
| Circulator | −570 | Not Applicable |
| Comb. Air Fan | −14.5 | −14.5 |
| Expander | +1350 | +1350 |
| Steam Turbine | +930 | +930 |
| Excess Shaft Horsepower | +77.5 | 0 | m = lbm/minute
T = °F.
P = psia
HP = horsepower

TABLE 2

| State Point | Without Air Motor | | | With Partial Flow Through Air Motor | | | With Full Flow Through Air Motor | | |
|---|---|---|---|---|---|---|---|---|---|
| | m | T | P | m | T | P | m | T | P |
| (A) | 16,245 | 269 | 49 | 16,245 | 269 | 49 | 16,245 | 269 | 49 |
| (B) | 17,317 | 273 | 50 | 17,317 | 273 | 50 | 17,317 | 273 | 50 |
| (C) | Not Applicable | | | 698 | 280 | 50 | 1,072 | 217 | 50 |
| (D) | 1,072 | 348 | 50 | 1,072 | 455 | 92 | 1,072 | 217 | 50 |
| (D)' | Not Applicable | | | 698 | 455 | 92 | 1,072 | 392 | 72 |
| (D)" | Not Applicable | | | 374 | 455 | 50 | 0 | — | — |
| (E) | 1,072 | 80 | 14.6 | 1,072 | 80 | 14.6 | 1,072 | 80 | 14.6 |
| | HP | | | HP | | | HP | | |
| Compressor | −1618 | | | −2265.5 | | | −1885 | | |
| Circulator | −570 | | | Not Applicable | | | Not Applicable | | |
| Comb. Air Fan | −14.5 | | | −14.5 | | | −14.5 | | |
| Expander | +1350 | | | +1350 | | | +1350 | | |
| Steam Turbine | +930 | | | +930 | | | +930 | | |
| Excess Shaft Horsepower | +77.5 | | | 0 | | | +380.5 | | | m = lbm/minute
P = psia
T = °F.
HP = horsepower

I claim:

1. A fuel cell power plant comprising:
a fuel cell assembly for production of electric power and heat,
compressor means for providing relatively high pressure oxygen bearing gas to the fuel cell power plant from relatively low pressure oxygen bearing gas,
means for supplying said relatively low pressure gas to the compressor means,
means for exhausting said relatively high pressure gas from the fuel cell power plant,
conduit means for containing the relatively high pressure gas and directing flow of said high pressure gas to and from the fuel cell assembly,
cooling means for rejecting the heat produced by the fuel cell assembly, and
circulation means for moving the relatively high pressure gas contained within the conduit means in the direction and at a rate that are predetermined, said circulation means powered by a gas driven motor deriving power from one of the group consisting of a gas pressure difference within said fuel cell power plant and a gas pressure difference between said fuel cell power plant and atmospheric pressure.

2. The device of claim 1 wherein the fuel cell assembly is of the phosphoric acid type.

3. The device of claim 1 wherein said cooling means comprises means for generating steam.

4. The device of claim 1 wherein said gas driven motor derives power from the pressure difference between compressor output pressure and the relatively high gas pressure within the conduit means.

5. The device of claim 1 wherein said gas driven motor derives power from the pressure difference between the relatively high gas pressure within the conduit means and atmospheric pressure.

6. The device of claim 1 wherein said gas driven motor derives power from the pressure difference between the relatively high gas pressure within the conduit means and compression suction pressure.

* * * * *